3,315,015
METHOD FOR GRANULATING MATERIAL
Ernest W. Greene, Westfield, and Tom A. Cecil, Highland Park, N.J., assignors to Minerals & Chemicals Philipp Corporation, Menlo Park, N.J., a corporation of Maryland
Filed June 16, 1964, Ser. No. 375,557
10 Claims. (Cl. 264—15)

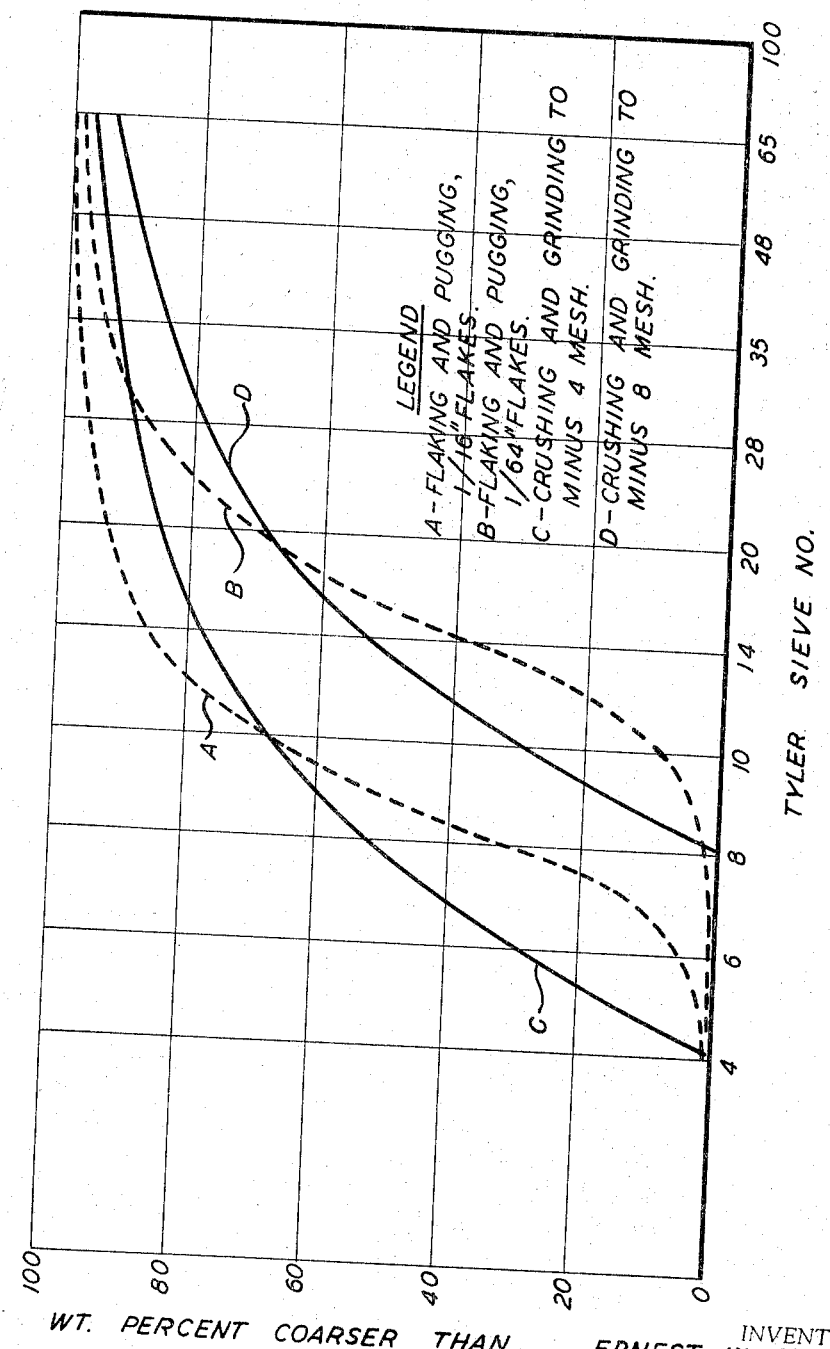

This invention has to do with a method for granulating masses of plastic consistency and is directed, especially, to a novel method for granulating mineral masses which possess plastic properties.

Pulverulent solids, such as clays, are usually granulated in substantially the following manner to provide mesh-size grades of adsorbents, catalysts, catlytic carriers and the like. Initially the water content of the material is adjusted to provide a uniform plastic mixture. The plastic mixture is then formed into compact masses. This is usually done by extruding the mixture into strands or noodles which are cut into pellet form. These masses are dried at least to the extent that they are no longer plastic and can be crushed and ground. The dried particles are then crushed, ground and separated into fractions each containing angular or irregularly shaped granules of a more or less limited mesh size. Similar granulation processes have been used or have been suggested for use in certain fertilizer and soap manufacturing operations. In these processes the granules are obtained by forming friable nonplastic chips or the like and grinding the dry friable chips.

Granulation by the aforementioned methods of crushing and screening friable nonplastic solid masses invariably results in the formation of granules of widely varying particle sizes. It is not possible to produce products composed entirely of particles within a desired limited mesh-size range by such processes. Some of the granules, referred to as "oversize," will be larger than desired, and other granules, referred to as "undersize," will be too fine. Moreover, dustiness is generally an inherent property of granular products obtained by crushing and grinding friable solids. With many materials, such as clays, the dust adheres tenaciously to the granules and is not removed from the granules during or after the sizing step. As a result, even those granules of the desired limited mesh-size range will be dusty.

The following are illustrative of results in a typical commercial operation producing adsorbent granules from attapulgite clay (Georgia-Florida fullers earth). In this plant, raw moist clay is extruded at a volatile matter content of about 55% to 60%, dried to a volatile matter content of about 14% to 16% to destroy plasticity, crushed, hammer milled to minus 4 mesh or minus 8 mesh specifications, and screened to obtain granular products of desired mesh size. When the mills are operated to produce a minus 8 mesh grind, as much as half of the crushed product may be plus 14 mesh material for which the market is very small as compared to the market for $14/32$ or $28/60$ mesh clay granules. The amount of $14/32$ and $28/60$ fractions each may account for only about 20% of the total ground material. These granular fractions are frequently visibly dusty. About 10% of the ground material may be minus 60 mesh material for which the demand is small as compared to the demand for coarser granular grades of the clay. It is not possible to eliminate completely the undersize and oversize in the plant by adjusting the grinding conditions to obtain finer or coarser products. When a coarser grind is made, e.g., when the dried pellets are ground to pass a 4-mesh screen, the quantity of minus 60 mesh undersize is reduced. However, the amount of $4/8$ mesh is increased. On the other hand, grinding to minus 28 mesh, for example, reduces oversize, but in this case, a major amount of the product will be minus 60 mesh.

This characteristic of granular products obtained by the prior art process is readily visualized by examining particle size distribution curves of the products. Such curves correlate particle size with cumulative weight percent coarser than a given particle size. The particle size is usually plotted on a logarithmic scale as the abscissa. Obviously, the sharper the slope of an portion of such curve, the closer the particle size distribution of the product within the limited size range represented by that portion of the curve. Thus, for example, the particle size distribution curve of the fullers earth milled to minus 8 mesh, as described hereinabove, will be generally flat and it will not have a sharp slope indicative of close sizing in a limited particle size range.

Another detractive characteristic of the prior art granulation process is that considerable heat is wasted when the charge is dried before being reduced to granular size. This wastage results from the fact that all of the blocks, pellets, chips or the like, must be dried before comminution. Heat transfer is obviously not as efficient under such conditions as it would be if the material were granulated and subsequently dried. Also, the heat utilized in drying the undersize and oversize is wasted when these fractions are discarded. Similar problems exist, of course, in the granulation of materials other than clays when these materials are granulated, dried, milled and then sized.

A general object of this invention is the provision of a method for granulating material of plastic consistency which obviates the difficulties and disadvantages of prior art granulation processes.

Another object of this invention is to provide a process whereby plastic material may be converted into practically uniform, dustless round granules.

Still another object of the invention is the provision of an improved granulation process wherein only particles falling within a desired limited mesh-size range are dried, so that no heat is consumed in drying oversize or under-size which, if desired, can be recycled and regranulated.

A specific object of this invention is the provision of a method for forming plastic hydrophilic mineral masses into nondusty, round granular particles of a more or less limited size range while the material is still plastic, in contrast with the prior art processes wherein granulation of the mineral mass occurs when the material is dry and is no longer plastic and the resulting particles are irregular in shape and are heterogeneously sized.

Another important object is to provide a remarkably simple and inexpensive method for granulating particulate solid matter.

These and other features of this invention will be made clear from the following description taken in conjunction with the accompanying drawing, which is a graph containing cumulative logarithmic diagrams of sieve analyses of granular clay products obtained by the process of this invention and similar diagrams of granular products obtained by the conventional prior art granulation process.

Stated briefly, in accordance with this invention, plastic material, especially a plastic mixture of finely divided mineral matter and water, is rolled into flake form and the resulting flakes, while still of plastic consistency, are converted into round, substantially uniform granules by continuously comminuting and tumbling the flakes in a type of agitated mixer known as a pug mill. The pugging is continued until the charge in the mill is converted by the combination of cutting and tumbling into a strewable material consisting of substantially uniform rounded granules, the mesh size of which is largely controlled by the thickness of the flakes that were charged to the pug mill. In most instances, the granules are sized to separate two or more desired mesh-size fractions and then dried to eliminate liquid and destroy plasticity. Usually sizing is carried out before drying, whereby any oversize and/or undersize can be recycled to the flaking mechanism without a drying step.

The granular product obtained by comminuting and tumbling plastic flakes in a pug mill and then drying, in accordance with this invention, is characterized by containing particles largely within a size range that is very limited as compared to the size distribution of granules obtained by extrusion, drying and crushing, in accordance with the prior art. Thus, the particle size distribution curve of the unclassified product has a very sharp slope in the desired mesh-size range. Further, the granular product is usually remarkably low in dust content. Another desirable characteristic is that the granules are round, or at least have rounded corners. The latter property is considered to be very desirable or essential in many granular products, such as, for example, granular adsorbents.

One essential characteristic of the process of the invention is that the plasticized pulverulent mass must be preshaped into the form of flakes by a rolling operation before the pugging step. In this manner the charge is compacted in one direction and and the dimension established by the rolling is retained substantially throughout pugging, thereby granules of predictable size are produced. The desired results are not realized when the masses are preshaped into other forms, such as extruded pellets. In the latter case, compaction is in all directions and more than one dimension of the charge is established. The result of pugging such material is a granular product having a heterogeneous particle size distribution similar to the particle size distribution of extruded granules which are dried and then ground in accordance with the prior art. It is, however, within the scope of this invention to extrude the plastic charge before flaking. In fact, preliminary data indicate that extrusion before pugging and flaking may promote the formation of more uniformly sized granules.

Another essential characteristic of our process is that the plastic flakes are pugged in a manner such that they are continuously tumbled against solid surfaces, including rotating flights of an agitator, whereby the cut flakes are continuously impacting solid unyielding surfaces within the pugger. The desired closely sized product is not produced with puggers operated in a manner such that they merely mix or knead and consolidate the particles with each other and provide little tumbling or cascading of the particles against solid nonyielding surfaces.

FORMATION OF PLASTIC CHARGE FOR GRANULATION

This invention is applicable to the granulation of a wide variety of materials which are powdered or pulverulent when dry and which, when moistened with a suitable liquid and in controlled quantity, form masses having plastic properties. Organic and inorganic solids are considered to be within the scope of this invention and the liquids may be aqueous or nonaqueous. The invention is considered to be of especial importance in the granulation of minerals capable of forming a cohesive plastic mixture with a suitable aqueous liquid. The simple equipment requirements and low heat expenditure make the process of the invention especially valuable in the granulation of earthy material, such as plastic clays, talc, prophyllite, bauxite and diaspore; also, mineral admixtures such as, for example, porcelain body compositions comprising comminuted clay, feldspar and flint or clay and nepheline-syenite. The process is also applicable to the granulation of processed minerals such as acid-treated or alkali-treated clays. The term "clay" as broadly used herein encompasses a wide variety of materials including a hydrated aluminum silicate as the chief mineral constituent and includes hydrated aluminum silicates with or without substitution of aluminum in the lattice by metals such as magnesium, calcium or sodium. Among the plastic clays may be mentioned the plastic kaolins, bentonites, including the Southern bentonite (sub-bentonites) and Western bentonites, attapulgite, sepiolite, mixtures of the aforementioned, and mixtures of one or more plastic clays with particulate herbicides, insecticides, plant food material, catalytic solids or precursors of catalytic solids, etc. Water used to plasticize the clay can be at least in part the water absorbed from the atmosphere by the clay or other solid. Some clay materials, such as attapulgite, are very hygroscopic and may absorb sufficient moisture from the atmosphere during storage to plasticize the clay. Addition of water to such clay crudes may not be necessary. Alkali, acid, salts, etc., can be dissolved in the water to increase the hardness and/or to control other properties of the granules. Also, ingredients can be incorporated into the water to impart plasticity to the finely divided ore. Some solid materials may require water removal, as by filtration and/or drying, to convert the material from mobile condition to the required plastic state.

The solid to be granulated should be composed largely of particles finer than 200 mesh, preferably finer than 325 mesh.

The quantity of liquid required to produce a plastic mixture with a given solid will obviously vary, among other factors, with the liquid and the degree of subdivision of the solid. Considerable variation can be expected when operating with different mineral masses. The realization of satisfactory results requires that the mass has an appropriate plastic consistency when charged to the flaking rolls. The desired closely sized product will not be obtained when too little liquid is used to plasticize the charge or when the mass is mobile instead of being plastic.

In the case of raw (uncalcined) attapulgite clay, which gives especially good results, the liquid water content of the clay should be adjusted by addition of water, or mild drying, if necessary, to adjust the volatile matter (V.M.) of the clay to an amount usually ranging from 55% to 58%. Optimum V.M. will vary with clay crudes of different orgin. The mixing of solid and liquid can be carried out in a pug mill, cement mixer, or any mixer capable of uniformly mixing a heavy mass. As mentioned above, uniformity of the product may be improved by extruding the plastic mixture and charging extruded pellets to the roll flaking equipment.

FLAKING

The flaking of the plastic mix is carried out on a continuous basis by charging particles of the mix between the gap or bite of smooth-surfaced, closely-spaced rotating drums or rolls. The feed can be charged on a continuous basis at a steady rate of feed from a suitable hopper. The drums can be surfaced with wear-resistant material such as tungsten carbide when abrasive materials are to be processed. Stainless steel will usually suffice with other materials. The drums can be counterrotating or they can rotate in the same direction and can be operated to rotate at the same peripheral speed or at different speeds so that the charge is sheared during the flaking. The charge should be scraped from the surfaces of the drums, as by doctor blades, after passing between the gap between the drums. The desired flakes are formed by the scraping. No heat is applied to the charge during flaking and appreciable drying, which would occur if the flakes were formed on a drum drier, will destroy the plasticity of the flakes. Since an essential characteristic of our process is that the flakes are in plastic condition when charged to the pugging equipment, the loss of plasticity at this point of the process will be detrimental.

As mentioned hereinabove, particle size distribution of the granulated product is controlled largely by the thickness of the flakes. Flake thickness should be within the range of 0.07″ and $\frac{1}{8}$″ and, therefore, assuming minimal shrinkage of the flakes after they have passed through the rolls, the gap between the rolls should be between 0.007″ and $\frac{1}{8}$″. We prefer to operate with a roll clearance or gap ranging from $\frac{1}{16}$″ to $\frac{1}{64}$″ since flakes of such thickness usually result in the formation of particles largely within a very limited mesh-size range. When the roll clearance is appreciably greater than $\frac{1}{16}$″, or appreciably less than $\frac{1}{64}$″, the close sizing may not be realized. The product obtained by tumbling the preferred flakes, which have a thickness ranging from $\frac{1}{64}$″ to $\frac{1}{16}$″, will usually be composed of a substantial percentage of particles which will be retained on screens having $\frac{1}{64}$″ and $\frac{1}{16}$″ openings, respectively, indicating that agglomeration is a factor in the granulation process.

The length and width of the flakes can vary within wide ranges. For example, the flakes can be long, ribbonlike particles or they can be rectangular. Typical flakes may be from $\frac{1}{4}$″ to 2″ wide, from $\frac{1}{4}$″ to 6″ long and, as mentioned, from $\frac{1}{64}$″ to $\frac{1}{16}$″ thick. It is not necessary to provide flakes of uniform width and/or length. Only uniform flake thickness is essential.

GRANULATION

As mentioned, the plastic flakes are granulated by combined cutting and tumbling against solid surfaces. We can use any type of pug mill operated under conditions of speed and loading for the type of charge material to provide these actions. Excellent results have been obtained in a batch process by charging the flakes to a type of continuous-flight pug mill comprising a horizontal trough provided with two continuous screws (worms) adapted to rotate in opposite directions in a closely fitting trough having an open top. The mill, especially the relative position of the screws and the housing, is similar to the double-screw log washer illustrated in Taggart's "Handbook of Mineral Dressing," 10–07, published by John Wiley and Sons, Inc. (1945). Such a mill apparently gradually tears or shreds the flakes. As the torn or shredded particles are formed they tumble and impact the rotating screws and the walls of the mill, initially forming very small granules which agglomerate to form larger particles by the kneading action of the pugger until the granules are so compact that further agglomeration and growth is prevented. That the flakes initially form fines which subsequently accumulate into the desired granular size particles is shown by particle size distribution curves of the flakes after pugging in the double-screw mill after successive intervals of time. These curves show a decrease in undersize with time and, simultaneously, an increase in oversize. Another type of pug mill that is suggested is one provided with a rotatable shaft carrying shafts or blades, such as the pug mills illustrated in Figure 5, 10–05 of Taggart's "Handbook of Mineral Dressing." Satisfactory products have also been obtained when the flakes were tumbled in a ribbon blender. Continuous or batch puggers can be used. However, whether the pugger is of the batch or continuous type, it is essential to employ a pugger provided with means for discharging and dumping the granules without consolidating them. Thus, double-screw extruders which discharge the feed through die-plates are not suitable.

Pugging time is usually within the range of 5 minutes to 2 hours, and preferably about $\frac{1}{4}$ hour to 1 hour. Optimum pugging time, which will vary with the plasticity of the flakes, flake thickness, and with the particular pugging equipment, can be readily determined by simple experiment. When the time is inadequate, there will be excessive oversize and also excessive undersize in the product. Usually prolonged pugging will not hurt the product although with some charges oversize may develop as pugging is continued beyond an optimum point.

CLASSIFICATION

The green granules from the pugger are still plastic and conventional dry-sizing equipment, such as dry-screening devices, cannot be employed to classify the granules since the plastic material will blind the openings in the screens. To separate out the desired size fraction, or fractions, at this point, of the process, and thereby permit undersize and/or oversize to be recycled to the flaking rolls or to the extruder, hot screens can be used. The following procedure is also recommended. The procedure involves the use of the rotating disc that is illustrated in Figures 6 to 8 at page 64 of "Iron and Steel Engineer," February 1956, modified, as hereinafter described, so that the disc functions as a classifier rather than as a balling disc as intended. The disc, as illustrated, consists of a pan which rotates slowly on a tilted axis. The spray system is dispensed with when the disc is modified for purposes of classifying the plastic granules discharged from the pug mill. The disc is rotated at a speed sufficient to cause the granules to tumble on themselves and spread substantially over the disc at positions determined by the diameter of the granules. One or more chutes are added to the system and they are placed adjacent the base of the disc at a suitable position to intercept and continuously discharge particles traveling past that position. Granules are also continuously withdrawn at the periphery of the disc. The modified disc effects a sharply defined classification of at least one fine size fraction of plastic material and no balling occurs.

It is also within the scope of this invention to dry the granules and then size them. In this case, conventional dry sizing equipment, such as screens, can be used. However, as mentioned, this procedure may result in raw material wastage and unnecessary expenditure of heat, unless the oversize and undersize of the classification step can be reused or recycled in the process.

The granules can be processed before or after the classification step, by physical means, such as heat-activation or additional tumbling to round further the granules, or by chemical means, such as impregnation or ion-exchange.

It is also within the scope of this invention to add small amounts of dry, powdered solids along with plastic flakes in the pugging step. These solids may comprise an active ingredient, such as a herbicide or pesticide, which is eventually bonded by the other solids in the granules. The added solid may be a mineral-diluent, such as plant recycle fines, which are incorporated into the product for economic reasons or, in some instances, to control the consistency of the charge in the pugger.

The following examples illustrate the production of adsorbent clay granules by the process of this invention. The starting clay used in the examples was an attapulgite clay crude from a mine near Attapulgus, Georgia.

In these examples, flaking was carried out by continuously feeding pugged clay into the gap between counter-rotating steel surfaced rolls, each roll having a 8″ diameter and being 4″ long. One roll turned at 242 r.p.m. (500 ft./min.) and the other roll turned at 573 r.p.m. (1200 ft./min.), representing a peripheral speed ratio of 2.5:1. The clay was continuously scraped from each of the rolls by a steel doctor blade mounted tangentially to the roll.

The double-screen pug mill used to granulate the flakes was a trough 8$\frac{1}{4}$″ long, 6$\frac{3}{4}$″ wide and about 8″ deep. The mill had an open top and was provided with two horizontal worm-screws adapted to rotate in close fit within the trough. Charges of about 1000 grams each were used with this mill. Each worm had a 4" spiral diameter and was 6½" long. The pitch of the flights was 4". The worms were geared to rotate in opposite directions with both worms rotating in a direction towards the sidewalls of the trough. One worm rotated at 38 r.p.m. and the other worm rotated at 24 r.p.m. (so that the peripheral speed of the outside flights of the worms were 22.0 and 34.8 ft./min.). These speeds were sufficient to maintain the charge in a condition such that discrete, free-flowing clay particles were continuously cascading and impinging the revolving screws and the inner walls of the pugger while the mill was in operation. The trough was discharged by rotating the mill about its bearings until the contents were dumped.

Example I

The following experiments in granulating attapulgite clay were carried out for the purpose of illustrating some of the features and advantages of the process of this invention.

A sample of pelleted raw attapulgite clay extrudate was obtained from a commercial plant producing granulated attapulgite clay adsorbents. The pellets had a diameter of about 4/10" and a V.M. of 56.4%.

In accordance with this invention, a fraction of this extrudate was formed into granules while the clay was still in plastic condition by roll flaking the moist plastic clay between the counterrotating rolls and, without drying the flakes, pugging them for about 30 minutes in the double-screw pug mill and discharging the rounded granular product by inverting the mill. In order to obtain fine and coarse granular products, the process was carried out at different roll clearances. To permit screen analyses to be made, all of the products were dried at 350° F. to a V.M. of 14% to 16%. Using a 1/16" clearance, a comparatively coarse and closely sized product was obtained, as represented by Curve A in the figure. When the roll clearance was reduced to 1/64", a much finer but similarly closely sized product was obtained, as represented by Curve B in the figure.

To compare our process with the prior art granulation process, another fraction of the 4/10" extrudate at 56.4% V.M. was dried at 350° F. to a V.M. of 14% to 16%. Following commercial practice, the dried pellets were ground in a hammer mill, the operation of which was varied in two different runs to grind the extrudate to minus 4 mesh and minus 8 mesh, respectively. The results are presented by Curves C and D.

A comparison of Curves A and B with Curves C and D in the figure shows that products made by the process of this invention were significantly more uniform in particle size than products made by the conventional process.

Example II

To demonstrate the effect of flake consistency at constant flake thickness on the particle size distribution of the product, samples of an attapulgite clay crude were pugged with water to three different V.M. levels—54.3%, 56.9% and 59.4%. Each pugged crude was flaked with the counterrotating rolls operated with 1/64" roll clearance and then pugged in the double-screw pug mill for about 30 minutes. The pug mill discharge was then dried to permit screen analyses to be made. It was found that considerably less plus 8 mesh oversize and minus 60 mesh undersizes resulted with flakes having a V.M. of 56.9%.

Example III

To illustrate the necessity for flaking before pugging to provide a granular product of desirable size distribution, a portion of the 56.4% V.M. extruded attapulgite clay pellets was pugged for 30 minutes in the double-screw mill without being flaked. The pug mill discharged was dried to 14 to 16% V.M. and a screen analysis obtained. The results are shown in table form, along with data for the same extrudate which was flaked with the rolls set at 1/16" before being tumbled in the pug mill.

EFFECT OF FLAKING AS INTERMEDIATE STEP IN PRODUCTION OF GRANULAR CLAY

| Mesh Size—Tyler Sieve No. | Weight Percent Coarser Than— | |
|---|---|---|
| | Extruded and Tumbled in Double-Screw Pug Mill | Extruded, Flaked (1/16") and Tumbled in Double-Screw Pug Mill (Process of the Invention) |
| 4 | 28 | 1 |
| 6 | 38 | 6 |
| 8 | 49 | 33 |
| 10 | 62 | 69 |
| 14 | 74 | 87 |
| 20 | 82 | 94 |
| 28 | 89 | 97 |
| 35 | 94 | 99 |
| 48 | 96 | 100 |
| 65 | 98 | |

These data clearly show that when the clay was flaked before pugging, in accordance with our invention, the product had a more narrow particle size distribution than when an extrudate was charged to the pugger. Thus, when flaking was carried out, the plus 4 mesh coarse material accounted for only 1% of the product. In contrast, 28% of the product was plus 4 mesh oversize when the charge to the pugger was in the form of pellet instead of flakes. Further, when the charge to the pugger was in the form of flakes, 54% of the product was within the narrow range of 8/14 mesh. This percentage was significantly greater than the 25% of 8/14 mesh product obtained when the pugger was charged with extruded pellets that had not been flaked.

Example IV

To demonstrate the necessity for carrying out the pugging operation under conditions such that discrete particles are continuously tumbled against solid surfaces, a portion of the 1/16" flaked extrudate (56.4% V.M.) from Example I was pugged in a sigma blade mixer. The sigma blade mixer was operated under conditions such that the flaked clay was continuously cut and kneaded, as in dough making, and little tumbling and impaction against solid surfaces took place. Following is the particle size distribution of the product, together with data for granules obtained when another portion of the flakes were tumbled, in accordance with this invention, in the double-screw mill. All products were dried to a 14% to 16% V.M. specification to permit screen analyses to be made.

EFFECT OF TYPE OF PUGGING ON PRODUCTION OF GRANULES FROM 1/16" FLAKED CLAY

| Tyler Sieve No. | Weight Percent Coarser Than | |
|---|---|---|
| | Pugged Without Tumbling | Pugged With Tumbling (Process of the Invention) |
| 4 | 22 | 1 |
| 6 | 38 | 6 |
| 8 | 42 | 33 |
| 10 | 51 | 69 |
| 14 | 60 | 87 |
| 20 | 71 | 94 |
| 28 | 78 | 97 |
| 35 | 83 | 99 |
| 48 | 88 | 100 |
| 70 | 92 | |

A comparison of data for runs made in the two types of puggers shows that when the charge was tumbled under conditions within the scope of this invention, 96% of the product was ⅔₈ mesh. Only 56% was ⅔₈ mesh when the charge was pugged in a sigma blade mill without appreciable tumbling. With the sigma blade mill, 22% of the product was minus 28 mesh, in contrast with only 3% minus 28 mesh for the double-screw milled product.

*Example V*

To demonstrate the effect of flake thickness on the particle size distribution of the double-screw tumbled clay, a portion of the 56.4% V.M. extrudate was roll flaked with a roll clearance of ⅛″, tumbled in the double-screw pug mill, dried to 14% to 16% V.M. and then screened to analyze size distribution. The procedure was repeated with a roll clearance of 0.007″. Particle size distribution curves of the products were plotted and compared with the curves of products processed in the same way but flaked with roll clearances of ¹⁄₁₆″ and ¹⁄₆₄″ (Curves A and in the figure).

It was found that the curve for the product obtained with ⅛″ flakes did not have the sharp slopes of Curves A and B, indicating that the sizing was not as close.

With the very thin flakes (0.007″ flake thickness), 100% of the product was coarser than the flake thickness, demonstrating that substantial agglomeration of particles took place in the double-screw mill when the 0.007″ flakes were used. The product was somewhat finer, however, than when ¹⁄₆₄″ flakes were used in the process.

*Example VI*

Bauxite ore was granulated by the process of this invention in the following manner. 1500 grams of minus 30 mesh bauxite ore (about 30% V.M.) was crushed to minus 200 mesh, and mixed in the double-screw pug mill with a 4% dosage of NaOH in the form of a solution of 50% concentration (4 parts of NaOH to 100 parts by weight of volatile-free ore). Water was gradually added to the charge in the pug mill until the volatile matter was 35.8%. The contents were pugged until the charge had a plastic consistency. The caustic-treated bauxite was roll flaked with a ¹⁄₆₄″ gap between rolls. Without being dried, the flakes were tumbled in the double-screw pugger for 8 minutes. The product was dried and screened for purposes of size analysis. The particle size distribution was similar to that of the attapulgite clay product of Example I which had been obtained with the same roll gap.

The term "plastic" as used herein refers to the characteristic of being essentially permanently deformable in any dimension without rupture by an externally applied force of a value in excess of the yield point of the composition.

All mesh sizes mentioned herein refer to values obtained with Tyler screen-scale sieves.

Volatile matter (V.M.) is the weight percentage of a material that is eliminated when the material is heated to constant weight at 1800° F.

We claim:

1. A method for granulating material of plastic consistency which comprises:
    forming said plastic material into flakes by compressing it between closely spaced rotating rolls,
    and, while the flakes are still plastic, continuously cutting and tumbling them until substantially uniform plastic granules are formed.

2. The method of claim 1 in which the granules are classified as to size while still plastic and the granules of desired size are treated to eliminate plasticity, the remaining granules being reformed into plastic flakes and then cut and tumbled to produce granules, as set forth in claim 1.

3. The method of claim 1 in which said plastic material comprises particulate mineral matter plasticized with water and the granules are classified as to size before being dried to eliminate plasticity.

4. A method for granulating clay which has a plastic consistency when moist which comprises:
    adjusting the water content of said clay until it has a plastic consistency,
    forming the plastic clay into moist flakes by compressing it between closely spaced rotating rolls,
    while the flakes are still plastic, continuously cutting and tumbling them until substantially uniform plastic granules are formed,
    and drying granules of desired particle size.

5. The method of claim 4 in which the granules are classified as to size while still plastic and granules of desired size are dried to eliminate plasticity, the remaining granules being formed into moist flakes which are thereafter cut and tumbled to produce granules, as set forth in claim 4.

6. A method for granulating plastic clay which comprises:
    adjusting the water content of said clay until it has a plastic consistency,
    forming the plastic clay into moist flakes having a uniform thickness within the range of from about 0.007″ to about ⅛″ by compressing the plastic clay between closely spaced rotating rolls,
    continuously cutting the flakes and tumbling them against solid rotating surfaces until the flakes are formed into uniform plastic granules,
    and drying granules of desired particle size to eliminate plasticity.

7. A method for granulating plastic clay which comprises:
    adjusting the water content of said clay until it has a plastic consistency,
    forming the plastic clay into moist flakes having a uniform thickness within the range of from about ¹⁄₆₄″ to about ¹⁄₁₆″ by compressing the plastic clay between closely spaced counterrotating rolls,
    successively cutting and tumbling the flakes against solid surfaces until the flakes are formed into uniform plastic granules,
    and drying granules of desired particle size.

8. A method for granulating a finely divided mineral which has a plastic consistency when moistened with an aqueous liquid which comprises:
    forming a plastic mixture of said mineral and said aqueous liquid,
    forming said mixture into plastic flakes by pressing the mixture between rotating rolls spaced apart a distance ranging from ¹⁄₆₄″ to ¹⁄₁₆′″
    pugging said flakes in a manner such that the flakes are cut and tumbled against solid revolving elements,
    continuing the pugging until substantially all of the particles are in the form of round plastic granules of substantially uniform size,
    and drying granules of desired particle size.

9. The method of claim 8, in which the granules are classified as to size while still plastic, the granules of desired size are dried to eliminate plasticity and remaining granules are formed into moist flakes which are thereafter cut and impacted to produce granules, as set forth in claim 8.

10. A method for producing granular attapulgite clay substantially free from minus 60 mesh fines and plus 4 mesh oversize which comprises:
    pugging raw attapulgite clay with water until the volatile matter content of the clay is within the range of from about 55% to 58%,
    forming the pugged clay into plastic flakes having a uniform thickness within the range of from about 1/64" to about 1/16" by passing the clay between unheated smooth surfaced rotating rolls and scraping the moist clay from the rolls, pugging the plastic flakes in a manner such that the flakes are cut and tumbled into contact with solid revolving elements until the flakes form small, substantially uniformly sized round granules.

References Cited by the Examiner

UNITED STATES PATENTS

| | | |
|---|---|---|
| 2,032,624 | 3/1936 | Lyons. |
| 2,195,754 | 4/1940 | Robson et al. 241—3 |
| 2,835,452 | 5/1958 | Cline et al. 241—24 X |

ANDREW R. JUHASZ, *Primary Examiner.*